United States Patent [19]

Delhaes

[11] Patent Number: 4,463,955

[45] Date of Patent: Aug. 7, 1984

[54] SEALING DEVICE FOR A PIPE CONNECTION AND METHOD FOR SEALING SUCH A PIPE CONNECTION

[75] Inventor: Johannes C. Delhaes, Nuth, Netherlands

[73] Assignee: Rubber- en Kunststoffabriek ENBI B.V., Nuth, Netherlands

[21] Appl. No.: 558,387

[22] Filed: Dec. 5, 1983

[30] Foreign Application Priority Data

Dec. 22, 1982 [DE] Fed. Rep. of Germany ....... 3247452

[51] Int. Cl.³ .............................................. F16J 15/12
[52] U.S. Cl. ......................................... 277/1; 277/9;
277/166; 277/186; 277/207 A; 285/231;
285/345; 285/379
[58] Field of Search ............... 277/1, 9, 207 R, 207 A,
277/166, 181, 186; 285/230, 231, 345, 379

[56] References Cited

U.S. PATENT DOCUMENTS 2,340,852 2/1944 Wormeley .............................. 285/84
4,379,559 4/1983 Bohman ........................... 285/345 X

FOREIGN PATENT DOCUMENTS 2743238 4/1979 Fed. Rep. of Germany .
2754982 6/1979 Fed. Rep. of Germany .
3216682 1/1983 Fed. Rep. of Germany .
8102199 1/1982 Netherlands .
 284255 8/1928 United Kingdom ..................... 277/1
1033756 6/1966 United Kingdom ................ 285/230

Primary Examiner—Robert S. Ward, Jr.
Attorney, Agent, or Firm—W. G. Fasse; D. H. Kane, Jr.

[57] ABSTRACT

A sealing device for a pipe connection requires tighty clamping a sealing ring (1') made of elastomeric material in a socket and of a pipe section for the subsequent insertion of a plug-in end of an adjacent pipe section. An endless expanding ring (2) made of steel is held in an inwardly facing groove and butts in a gap-less manner against the base or bottom surface of an inwardly open groove (3) in the sealing ring (1'). The expanding ring (2) of steel is deformed by radially outwardly forces to increase the diameter of the steel ring slightly beyond the elastic limit of the steel of which the ring (2) is made. Thus, the circular outer periphery of the steel ring is still maintained even after the radially outwardly directed forces are removed, whereby the sealing device is locked in the socket against undesired displacement of the sealing ring (1').

7 Claims, 3 Drawing Figures

SEALING DEVICE FOR A PIPE CONNECTION AND METHOD FOR SEALING SUCH A PIPE CONNECTION

FIELD OF THE INVENTION

This invention relates to a sealing device for a pipe connection. Pipe connections requiring such sealing devices include a plug-in end of one pipe inserted into an appropriately widened socket end of another or succeeding pipe. The sealing ring is made of an elastomeric material and is located in an annular space in the socket between the plug-in end and the inner socket wall. The sealing ring is secured in its position in the socket by means of an expanding ring which is held in a radially inwardly open groove of the sealing ring. The invention also relates to a method for sealing such a pipe connection.

DESCRIPTION OF THE PRIOR ART

In producing such pipe connections a uniform diameter end portion of said one pipe is called the "plug-in end" which is pushed into the widened socket end of the other pipe. The socket forms an annular space or ring space around the plug-in end and the sealing ring must be properly retained in this ring space so that the outer periphery or circumference of the sealing ring butts tightly against the inside of the socket while the inner periphery or circumference of the sealing ring must butt tightly against the outside of the plug-in end.

The sealing function of such connections must satisfy high requirements. Where above-atmospheric or excess pressure is present inside the pipeline, for example, where harmful substances are passing through an underground pipeline, it is essential that not even the smallest quantities of such substances should be able to escape into the ground from the pipeline at the connection points or junctions between two pipe sections, because such escaping substances could contaminate the environment, especially the ground water. It is equally essential that excess pressures outside the pipeline should not be able to cause foreign matter to pass into the pipeline and thus, admix with or pollute the medium that is passing through the pipeline, which may, for example, be drinking water.

A tight connection can be accomplished in a comparatively simple manner between the elastic sealing ring and the plung-in end of the pipe by appropriately profiling and dimensioning the sealing ring so that it embraces the plug-in end with adequate bias forces which are effective radially inwardly. Simultaneously, it must be assured that a proper seal and position of the elastic sealing ring is maintained once it has been inserted into the pipe socket so that the ring is not pushed into the socket in an uncontrollable manner when the plug-in pipe end is inserted into the socket. This requirement calls for radially outwardly effective biasing forces which may not necessarily be compatible with the required radially inwardly effective biasing forces. Thus, various auxiliary means have been provided to fix the sealing ring in the socket, for example, expanding rings have been proposed as such auxiliary means.

German Patent Publication Nos. (DE-OS) 2,743,238 and (DE-OS) 2,754,982 disclose an expansible ring for socket seals which has, in axial section, a radially inwardly open U-profile, which ends, at one of the two lateral ends of the split expansible ring, in a tongue which is insertable into the U-profile of the opposite ring end where the tongue is lockable so that the ring is self-locking relative to a decrease in radius while simultaneously permitting a radial expansion in a continuous or stepwise manner. A rolling movement of the U-profile in the axial direction can be prevented by a stiff, dimensionally stable elastic flat band lug. The lug is formed as an integral part of at least one of the two limbs of the U-profile of the expansible ring and so as to extend axially and to peripherally encircle the ring. The lug has a predetermined width.

The elastic sealing ring, as described above, can indeed be well fixed in the socket with the known expanding ring. However, a gaplessly tight connection between the elastic sealing ring and the socket cannot be achieved. To reduce this problem the internal tongue of the expanding ring is provided with a smaller radius than the outer surface of the expanding ring. However, due to the overlapping joint of the two ends of the expanding ring, the expanding ring as a whole does not have a spiral course, rather its outer surface extends for the greater part in an exactly circular manner, whereby a small gap is formed at the joint which interrupts the circular shape of the outer surface and thus leaves a location between the elastic sealing ring and the socket which is not absolutely tight.

German Patent Publication (DE-OS) No. 3,216,682 and Netherlands Patent Publication No. 8,102,199 disclose an expanding ring which is not prone to this serious disadvantage. This expanding ring, too, is slotted and has an end which is formed as a tongue insertable into an end part having the shape of a stiffening corrugation and having a channel-shaped radially outwardly open cross-section. This known expanding ring is provided with a flange extending radially outwardly to avoid a gusset interrupting the sealing surface in the overlap region. However, the ends of the flange overlap and have in the overlap region individually a thickness which is considerably smaller than the thickness of the flange outside the overlap region. The combined thickness of the overlapped ends is, in this case, not greater than the thickness of the flange outside the overlap region. With this expanding ring good fixing of the elastic sealing ring and uninterrupted sealing between the elastic sealing ring and the socket may be achieved. However, the expanding ring is complicated in shape and accordingly expensive to produce.

U.S. Pat. No. 2,340,852 discloses a sealing ring for use in hose couplings which is equipped with radially directed sinusoidal undulations which are deformable in their radial amplitude.

Such a radially expanding sealing ring for a hose coupling is not suitable for use as a seal for a pipe connection.

OBJECTS OF THE INVENTION

In view of the above it is the aim of the invention to achieve the following objects singly or in combination:

to provide a sealing ring pipe connection which is held fast in the socket by a simple, yet effective expanding ring;

to provide an uninterrupted seal between the socket and the elastic sealing ring fixed securely in the socket and between the sealing ring and the plug-in pipe end; and to assure that plugging in of the plain plug-in pipe end into the socket will not disturb the sealing ring.

SUMMARY OF THE INVENTION

In the sealing ring according to the invention the expanding ring is made as an endless or undivided ring of steel wire, which butts with its circular outer periphery or circumference in a gapless manner against the base or bottom surface of a groove in the sealing ring and its diameter is enlarged beyond the limit of elasticity of the steel wire, in the operational position, when a plug-in pipe end is inserted into the socket.

The expanding ring of the invention has various advantages as compared with the known expanding rings made of plastics or synthetic material. An expanding ring made of steel can, for application of the necessary pressing force, be of considerably smaller cross-sectional dimensions and therefore it requires, for its accommodation in the annular space between the socket and the plug-in pipe end, considerably less space than prior art expanding rings of plastics. In contrast to an expanding ring made of plastics material, a ring made of steel is also less sensitive to temperature changes. A further advantage is seen in that expensive or complex molds are not necessary for making an expanding ring of steel. The production of such steel rings can, for example, use steel wire drawn from a roll on which it is stored in a practically continuous length.

In order to obtain an expanding ring with a continuous circular outer periphery or circumference the invention provides the expanding ring with axially directed sinusoidal undulations which are deformable in their axial amplitude.

In contrast to the above mentioned known expanding ring with radial undulations the expanding ring with its axial undulations in accordance with the invention has the advantage that the outer periphery of the expanding ring also butts in a gapless manner against the base or bottom surface of the groove even when, after expansion of the ring, residual axially directed corrugations remain.

BRIEF FIGURE DESCRIPTION

In order that the invention may be clearly understood, it will now be described, by way of example, with reference to the accompanying drawings, wherein.

Figures 1, 2, 3:
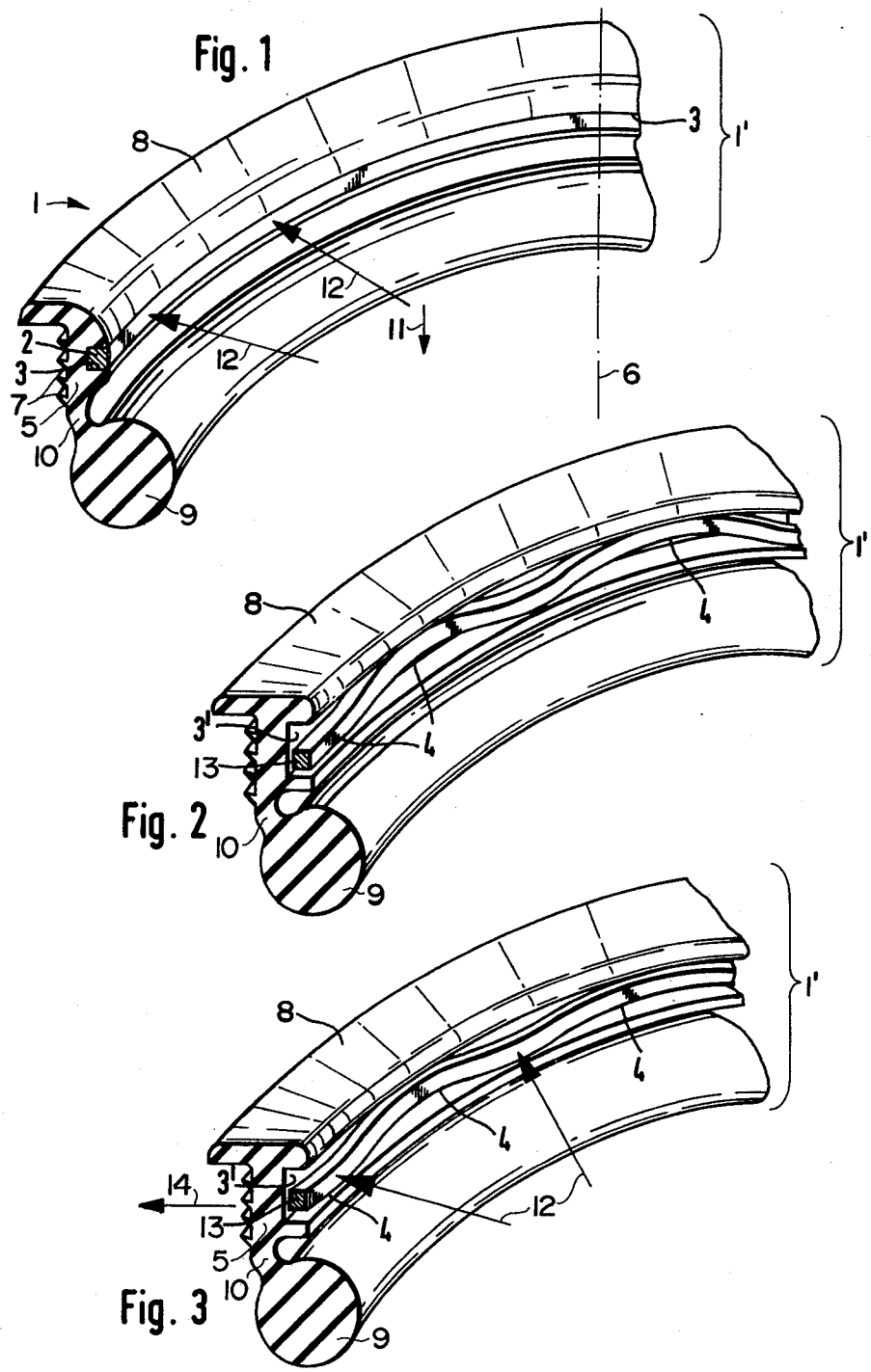
FIG. 1 is a fragmentary perspective view, partly in section, illustrating a first embodiment of the sealing ring for a pipe connection in accordance with the invention.
FIG. 2 is a view similar to FIG. 1, but showing a second embodiment.
FIG. 3 is a view showing the embodiment of the arrangement of FIG. 2 assumed in the operative position sealing two pipes, which have been omitted from the figures.

DETAILED DESCRIPTION OF PREFERRED EXAMPLE EMBODIMENTS AND OF THE BEST MODE OF THE INVENTION

A pipe connection sealing device 1 as shown in FIG. 1 comprises an elastic sealing ring 1' which is shown broken away and in a cross-section, and an endless or "unsplit" expanding ring 2 held in a radially inwardly open groove 3. The ring 1' is made of elastomeric material and the expanding ring is made of steel. The ring 1' has a central portion 5 extending axially relative to a longitudinal axis 6 and carrying said groove 3 in its inwardly facing side and having anchoring ridges 7 on its radially outwardly facing side. The central portion further has a flange forming portion 8 extending radially outwardly and resting against an end edge of a plug-in socket at the end of a pipe section not shown. The ridges 7 are preferably slanted toward the flange portion so as to oppose the pulling of the elastic ring 1' out of a socket. The ring 1' further comprises a bead portion flexibly hinged to the central portion 5 by a bridging portion 10. The bridging portion 10 permits the flexing of the bead portion 9 when a plug-in end of a pipe section is inserted into the socket in a direction indicated by the arrow 11.

The endless expanding steel ring 2 is made, for example, of steel wire and can be deformed past its limit of elasticity without losing its clamping or tensioning ability in the deformed state. Preferably, the expanding ring 2 is expanded or extended with the aid of an exactly controllable expansion device for applying a radially outwardly applied force indicated by the arrows 12 so that the expanding ring 2 is deformed to a diameter which is slightly larger than the diameter which is necessary for an adequate fixing of the elastic sealing ring 1 in the groove 3. If, finally, the expansion force is removed, it can be accepted without disadvantage if the expanding ring 2 deforms back to a limitedly smaller diameter as permanent deformation. The device retains this smaller diameter which is adequate for fixing the elastic sealing ring 1' in a socket.

In the embodiment of FIGS. 2 and 3, the elastic sealing ring 1' is constructed substantially the same as in FIG. 1, except that the groove 3' is wider in the axial direction than the groove 3 in FIG. 1. An endless expanding ring 13 is inserted into the groove 3'. The ring 13 is made of steel and has axially directed sinusoidal undulations 4 which are deformable in their axially directed amplitude. Because of the axial directions of the undulations 4, the expanding ring 2, in any state, retains an exactly circular outer surface and does not allow the formation of any pressure gaps between itself and the bottom or base of the groove 3' in the elastic sealing ring 1'. If the amplitudes of the undulations 4 are reduced, as is shown in FIG. 3, the circumferential length of the steel ring 13 becomes larger accordingly, whereby the diameter of the expanding ring 13 is uniformly enlarged to increase its radially outwardly effective biasing force indicated by the arrow 14 for pressing the sealing device into its socket so that inserting a plug-in pipe end into the socket will not disturb the proper seating and sealing effectiveness of the sealing ring 1'.

Although the invention has been described with reference to specific example embodiments, it will be appreciated, that it is intended to cover all modifications and equivalents within the scope of the appended claims.

What is claimed is:

1. A sealing device for a pipe connection in which a uniform diameter pipe end of one pipe section is plugged into a socket at an end of an adjacent pipe section, comprising a profiled sealing ring of an elastomeric material having an outer diameter fitting into said socket and a radially inwardly facing surface with a groove in said inwardly facing surface, said groove having a groove bottom, and an endless steel expansion ring in said groove, said endless steel expansion ring having a radially outer surface abutting in a gapless manner against said groove bottom, said endless steel expansion ring having an outer diameter which, in the sealing position of the sealing ring and thus in the expanded position of the endless steel expansion ring, is enlarged beyond the elastic limit of the steel of which the endless steel expansion ring is made.

2. The sealing device of claim 1, wherein said endless steel expanding ring comprises axially directed undulations which are deformable so that axially directed amplitudes of said undulations vary.

3. The sealing device of claim 2, wherein said undulations have a sinusoidal waveform.

4. The sealing device of claim 1, wherein said profiled sealing ring of elastomeric material comprises an axially extending portion having said outer diameter fitting into a socket and said inwardly facing surface with said groove, a radially extending portion forming a flange for bearing against an end edge of a socket, and a bead portion flexibly connected to said axially extending portion for providing a seal between a socket and a plug-in end of a pipe.

5. The sealing device of claim 4, further comprising a bridging portion flexibly connecting said bead portion to said axially extending portion.

6. The sealing device of claim 5, wherein said bridging portion biases the bead portion slightly into a radially inward direction.

7. A method of sealing a pipe connection in which a plug-in pipe end of one pipe section is inserted into a wider diameter socket at the end of another pipe section, comprising the following steps, inserting a sealing device including an elastomeric sealing ring and an expansible endless steel ring in a groove of said sealing ring, into said socket, and locking said sealing ring in said socket by applying radially outwardly directed expansion forces to the endless steel ring to such an extent that the endless steel ring is widened beyond the elastic limit of the steel to thereby cause a radially outwardly directed biasing force for said locking.

* * * * *